Aug. 5, 1958  S. BADLAM  2,845,822
INDEXING MECHANISM
Filed Nov. 5, 1953  6 Sheets-Sheet 1
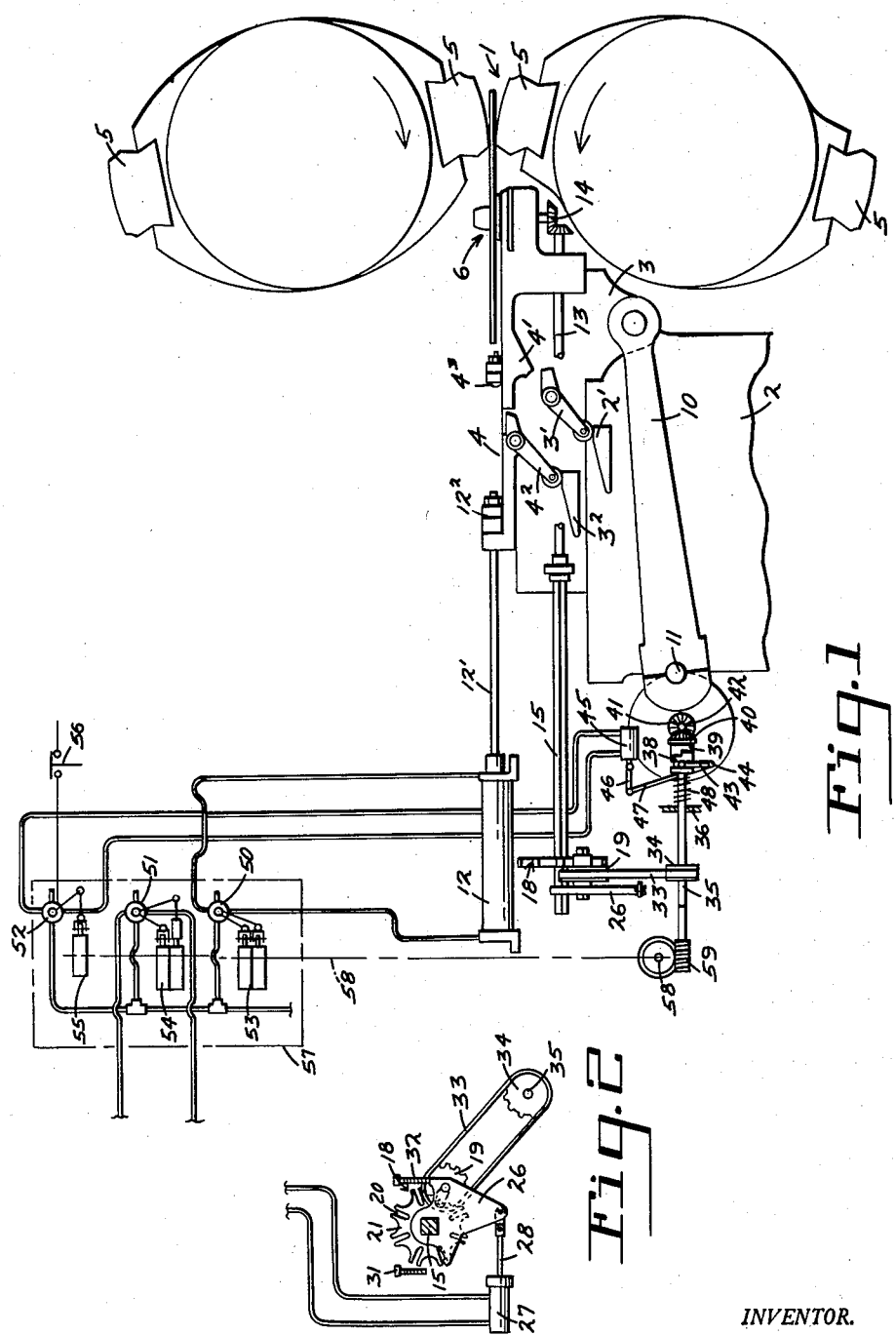
INVENTOR.
STEPHEN BADLAM.
BY

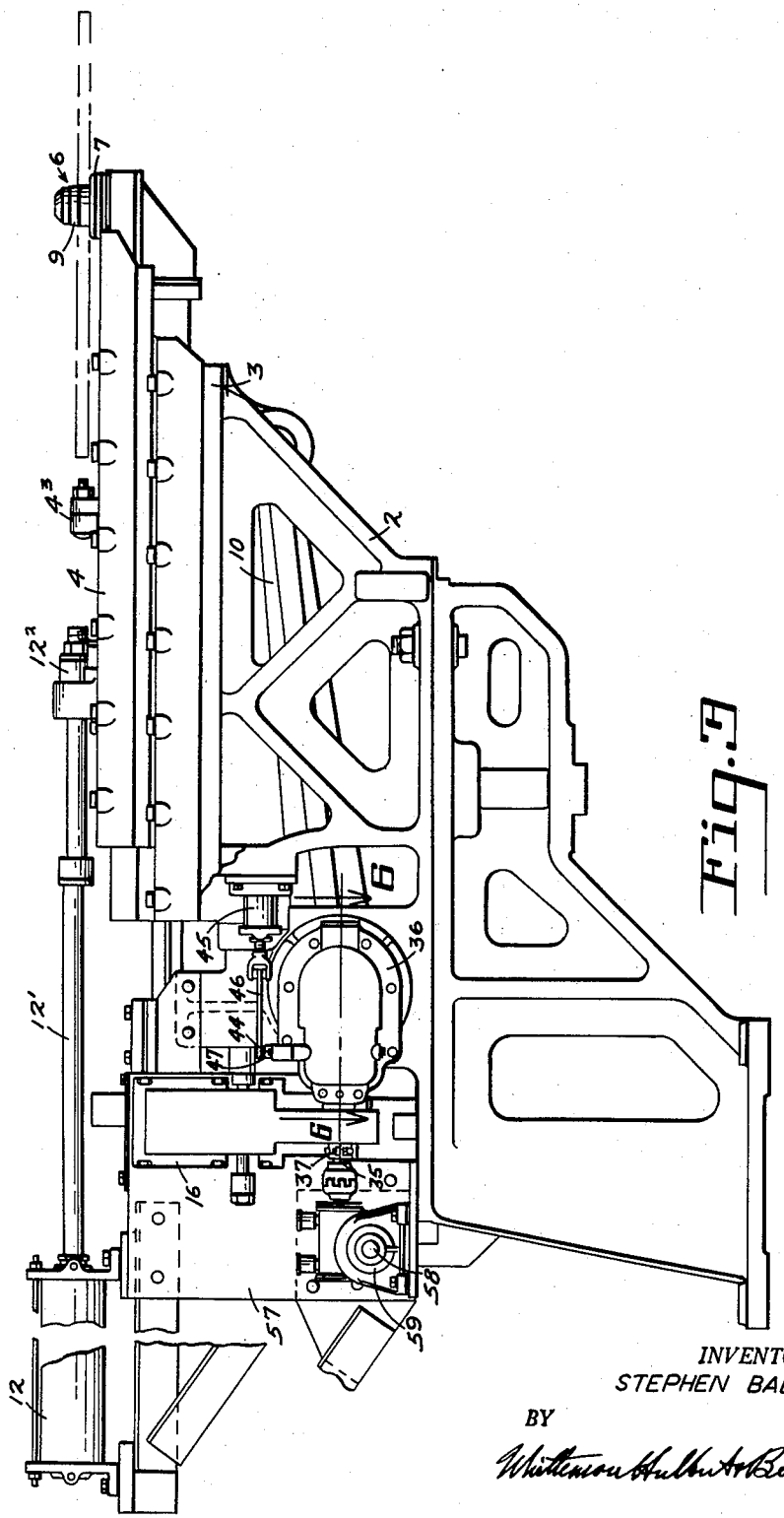

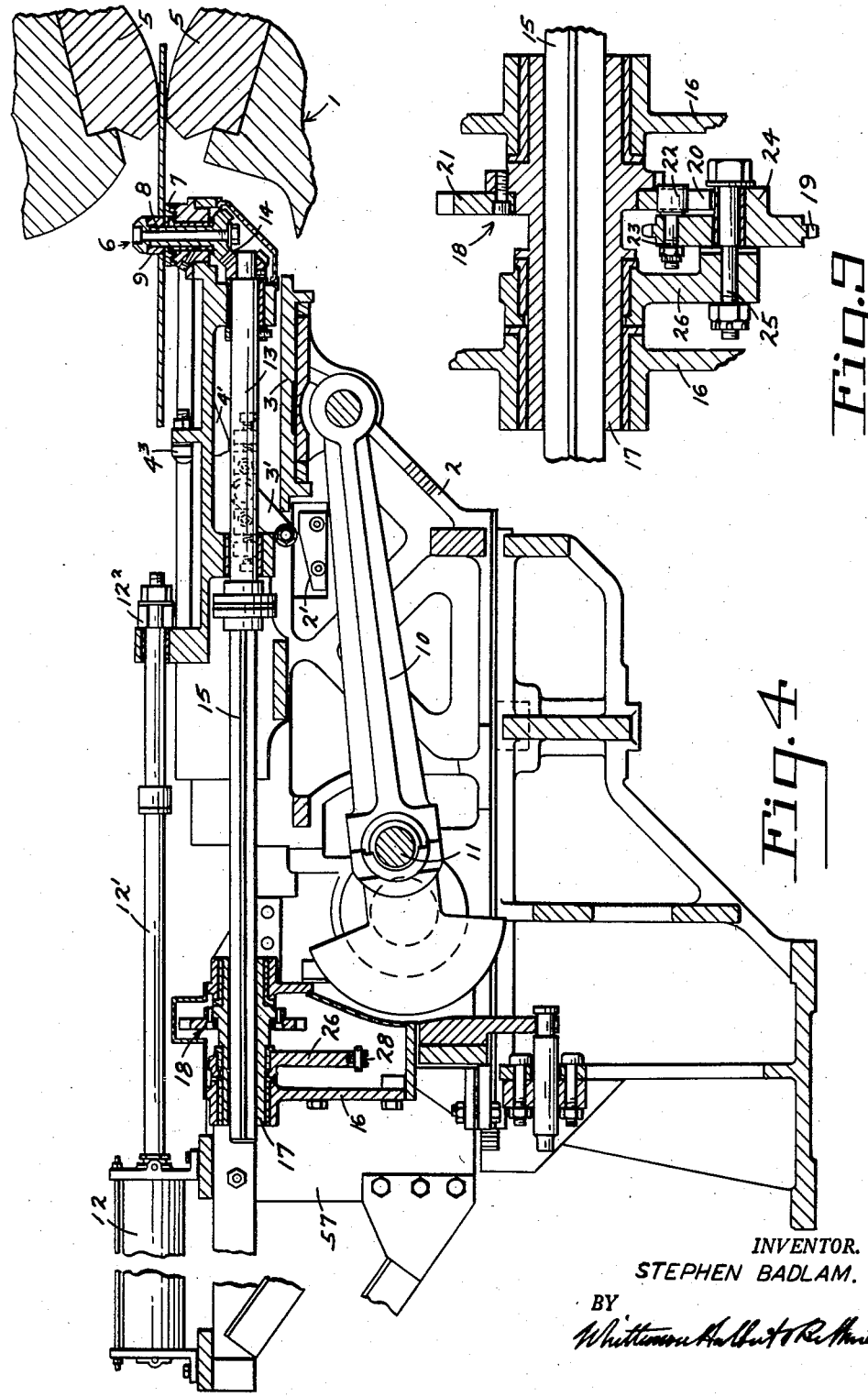

Aug. 5, 1958  S. BADLAM  2,845,822
INDEXING MECHANISM
Filed Nov. 5, 1953  6 Sheets-Sheet 4
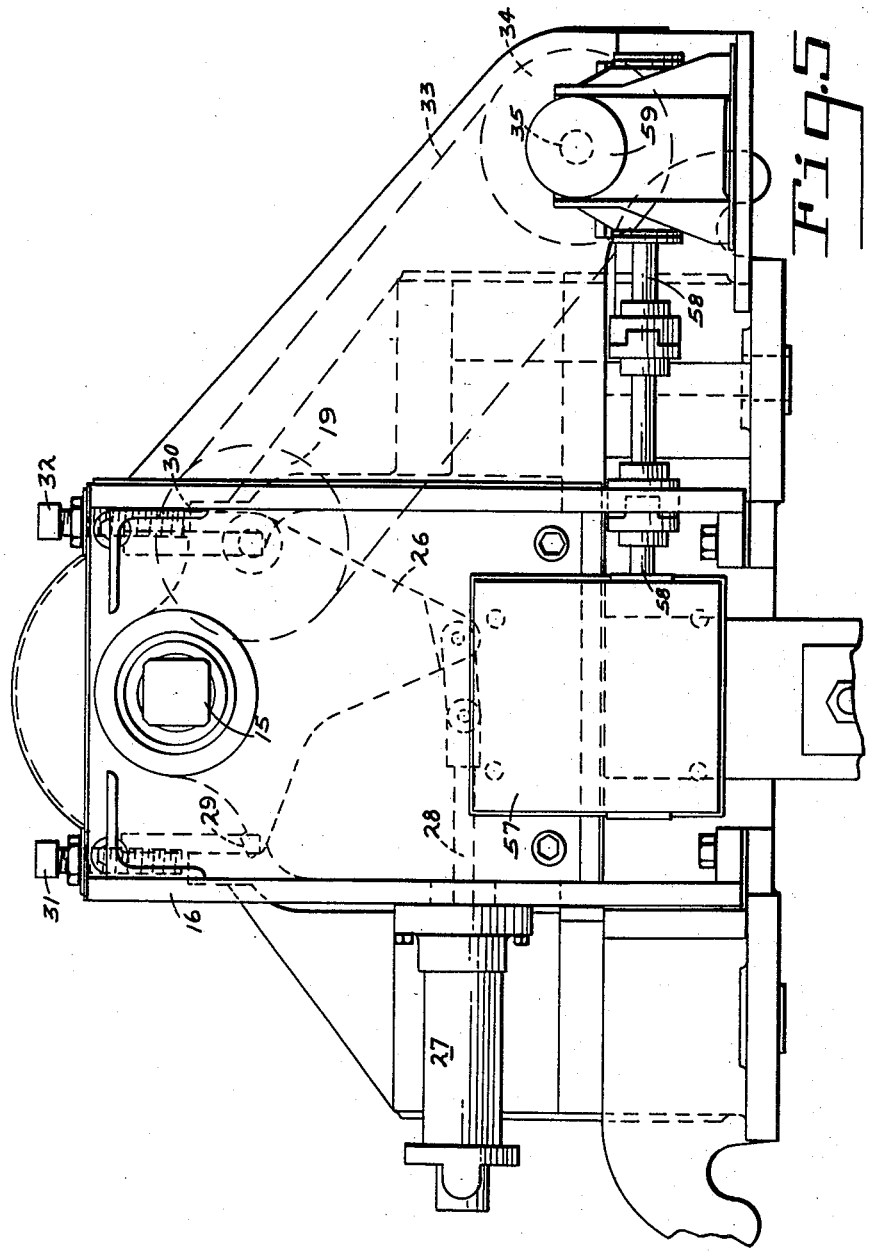
INVENTOR.
STEPHEN BADLAM.
BY

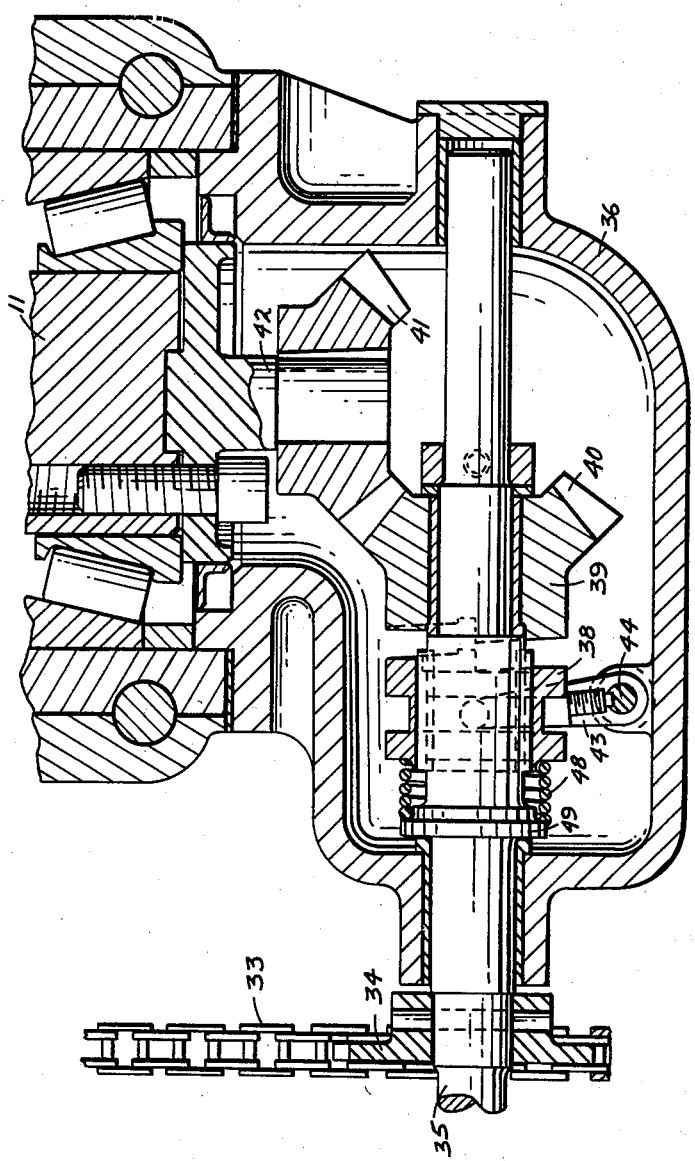

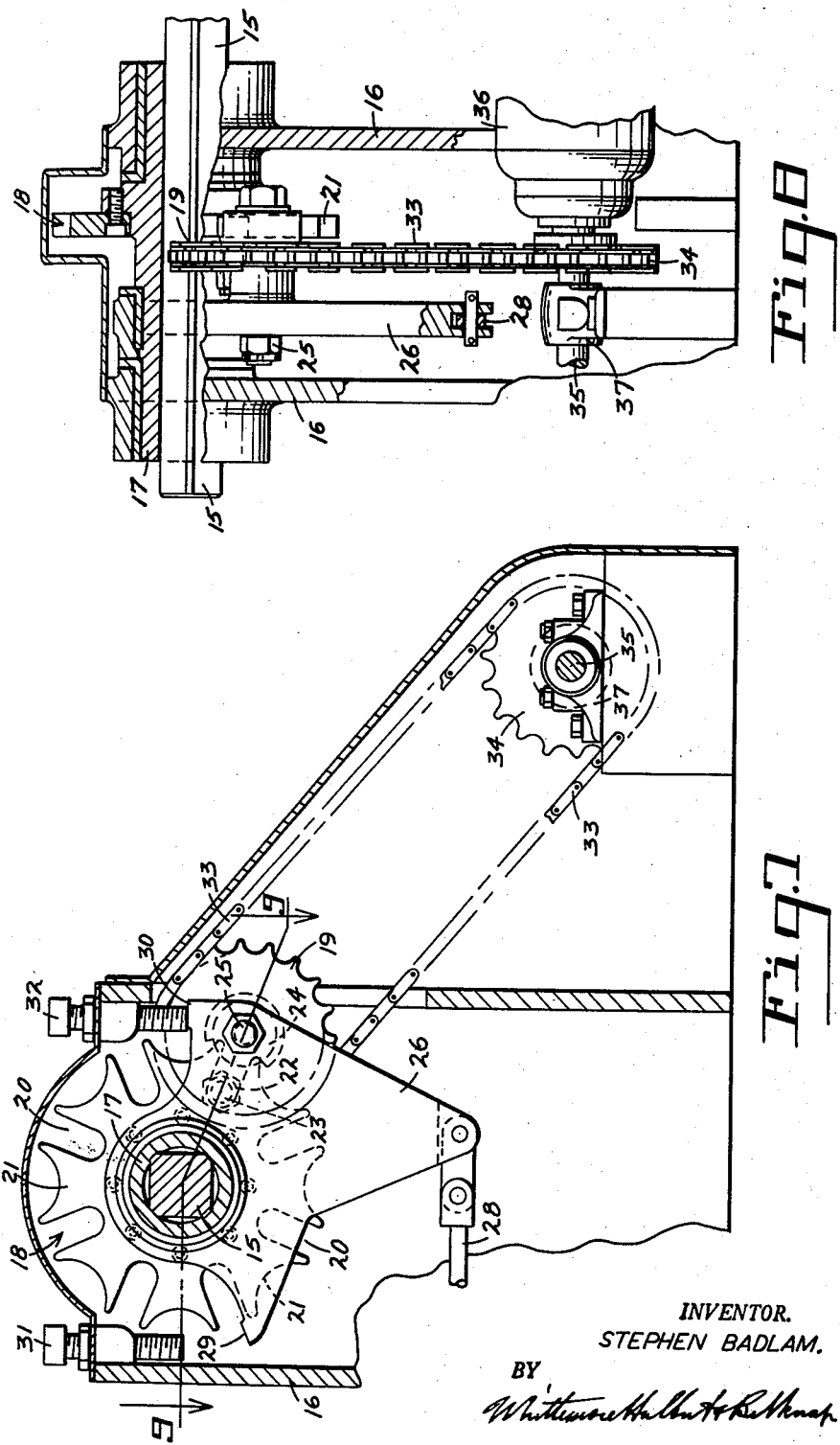

United States Patent Office 2,845,822
Patented Aug. 5, 1958

2,845,822

INDEXING MECHANISM

Stephen Badlam, Rosslyn Farms, Pa., assignor to Blaw-Knox Company, Pittsburgh, Pa., a corporation of Delaware Application November 5, 1953, Serial No. 390,371

9 Claims. (Cl. 74—820)

The invention relates to indexing mechanism and refers more particularly to indexing mechanism for effecting successive indexing movements of elements, such as work holders, of machine tools.

The invention has for one of its objects to provide an improved indexing mechanism constructed to index an element successively or step by step through a predetermined angle for a predetermined number of times, then through a different predetermined angle, and then through the first mentioned predetermined angle for a predetermined number of times.

The invention has for another object to provide an improved indexing mechanism comprising rotatable driving and driven members in constant engagement with each other to effect successive indexing movements and angularly movable bodily or as a unit to effect a different indexing movement.

With these and other objects in view the invention resides in the novel features of construction and combinations and arrangements of parts as more fully hereinafter set forth:

Figures 1 and 2 are diagrammatic views of an apparatus embodying the invention;

Figure 3 is a side elevation of the apparatus;

Figure 4 is a vertical sectional view through the apparatus;

Fig. 5 is an end view of a portion of the apparatus;

Figure 6 is a cross section on the line 6—6 of Figure 3;

Figure 7 is an end elevation of the indexing mechanism with its housing broken away;

Figure 8 is a side elevation of the indexing mechanism with parts broken away and in section;

Figure 9 is a cross section on the line 9—9 of Figure 7.

The indexing mechanism is particularly useful in machine tools for effecting successive indexing movements of elements, such as work holders, to successively present different portions of the work carried by the work holders for operation thereon. As illustrated in the present instance, the indexing mechanism is embodied in a rolling mill for rolling work blanks of substantially uniform thickness into tapered discs.

The rolling mill, in general, comprises the gap rolls 1, the upper base 2, the lower carriage 3, slidable on the upper base toward and away from the gap rolls and the work carrying table 4 slidable on the lower carriage in the direction of movement of the lower carriage.

Each of the gap rolls has the two replaceable dies 5 in the nature of shoes and these dies are engageable with the work blanks to process the same, each work blank being an octagonal disc blank of substantial uniform thickness which is first rolled along paths from its center or radially outwardly at right angles to its peripheral flats with one pass for each peripheral flat. Then the work blank is rolled along paths from its center towards its peripheral corners or radially outwardly through its peripheral corners or midway of the first paths or radii. Therefore, it is necessary that the blank be rotated 45° between consecutive passes for a series of eight passes, turned 22½°, and then rotated 45° between consecutive passes for an additional series of eight passes.

The end of the work carrying table nearest the gap rolls supports the holder 6 for the work blank, the holder comprising the support 7 upon which the work blank rests, the vertical shaft 8 extending through the support 7 and rotatably mounted on the work carrying table, and the pilot head 9 above the support and sleeved upon and secured to and rotating with the vertical shaft 8. The pilot head has its outer peripheral portions square in section to removably fit a square hole in the center of each work blank so that rotation of the vertical shaft will rotate the work blank.

The lower carriage 3 is adapted to be reciprocated and during its forward movement toward the gap rolls 1 it moves the work carrying table 4 forwardly and thereby feeds the work blank to the gap rolls. Suitable means comprising one or more latches or bell cranks 3' are pivoted on the lower carriage and are engageable with corresponding lugs 4' on the work carrying table to move the latter forward upon forward movement of the former. At the extreme forward positions of the lower carriage and work carrying table the latches or bell cranks 3' ride on to fixed cams 2' on the upper base 2 and are thereby tilted out of engagement with the lugs 4' and to inoperative position as shown in Figure 1 with the work blank in its extreme forward position in the mill, the dies 5 in initial engagement with the work blank and the work carrying table free to move away from the gap rolls independently of the lower carriage. The work carrying table is driven on its return stroke by the action of the gap rolls on the work blank at a considerably faster rate than the lower carriage. The work carrying table is normally moved forwardly and rearwardly a predetermined distance or through a predetermined stroke.

The lower carriage is connected to the connecting rod 10, which in turn is connected to the crank shaft 11. This crank shaft is geared to the gap roll drive and rotates at twice the speed of rotation of the gap rolls. As a result, the lower carriage is positively reciprocated in proper timed relationship with the gap rolls.

To withdraw the work carrying table 4 to unloading and loading position, at which time the work holder 6 is located rearwardly of its normal rearward position, and thereby locate the work holder a sufficient distance from the gap rolls to permit removal of the finished disc and the insertion of a disc blank to be processed, suitable mechanism is provided. The mechanism comprises the fluid cylinder 12, the piston rod $12^1$ to which is secured the cross arm $12^2$ and one or more latches or bell cranks $4^2$ pivoted on the work carrying table and engageable with the cross arm. For tilting the latches or bell cranks $4^2$ to clear and be free to move under the cross arm, fixed cams $3^2$ are provided on the lower carriage for engaging the latches or bell cranks during the final portion of the rearward movement of the lower carriage, the work carrying table having been moved rearwardly at a faster rate as previously described. In operation, the piston rod $12^1$ is moved rearwardly by the fluid cylinder 12 to engage the cross arm $12^2$ with the latches or bell cranks $4^2$ after the work carrying table has been moved rearwardly to its normal rearward position and before the lower carriage has been moved rearwardly a sufficient distance to move the fixed cams $3^2$ into engagement with the latches or bell cranks $4^2$. After the work carrying table has been moved rearwardly beyond its normal rearward position, it is free of the lower carriage and remains stationary although the lower carriage continues to reciprocate. Upon return or forward movement of the piston rod 12¹ by the fluid cylinder 12, the cross arm 12² engages one or more rubber pads 4³ on the work carrying table 4, thereby moving the work carrying table forwardly to its normal rearward position for forward movement by the lower carriage during forward movement of the latter.

The pilot head shaft 8 is connected to the shaft 13, which is journalled in the work carrying table 4, by the meshing bevel gears 14 on the shaft 13 and shaft 8. The shaft 13, in turn, is connected by a coupling to the axially aligned square shaft 15 which is adapted to be driven by the indexing mechanism embodying the present invention.

The indexing mechanism is located within the housing 16 secured to the upper base 2 and has the sleeve 17, the driven member 18 and the driving member 19. The sleeve 17 is journalled at its opposite ends in the housing 16 and has an axially extending square hole therethrough in which the square shaft 15 fits and is longitudinally slidable. The driven member 18 is a Geneva wheel secured to the sleeve and having the radial slots 20 and the intermediate spoke portions 21 formed with concave peripheries. The driving member 19 is a Geneva pinion or wheel provided with the roller 22 journalled upon the transverse pin 23 extending from the driving wheel and also provided with the hub 24. The roller is engageable in the radial slots 20 and the hub is formed to fit the concave peripheries of the spoke portions 21 when the roller is disengaged from a slot and to clear the parts of the spoke portions immediately adjacent the slot when the roller is in engagement with the slot. There are eight radial slots 20 so that for each rotation of the driving wheel 19 the driven wheel 18 is rotated through an angle of 45°. The angular pitch of the driven wheel, that is the angular distance between the radial slots 20 thereof, is thus 45°.

The driving wheel 19 is journalled on the transverse pin 25 mounted on the carrier 26 which is located within the housing 16 and is journalled on the sleeve 17, upon angular movement of the carrier the driving wheel 19 and the driven wheel 18 are correspondingly angularly moved in unison. To angularly move the carrier, there is the fluid cylinder 27 mounted on the housing 16 and having its piston connected to the connecting rod 28 which, in turn, is pivotally connected to the carrier 26. It will be noted that this carrier is formed with the two stop shoulders 29 and 30 which are engageable with the adjustable set screws 31 and 32 threaded in the upper portion of the housing 16 to limit the swinging of the carrier in opposite directions through an angle of 22½°. The driving wheel 19 is adapted to be rotated by the sprocket chain 33 extending around and engaging peripheral teeth on the driving wheel and also extending around the sprocket wheel 34 which is mounted on and secured to the shaft 35. The number of teeth on the driving wheel is the same as the number of teeth on the sprocket wheel. It will be noted that the angular movement of the carrier 26 is such that the axis of the driving wheel 19 in either position of adjustment of the carrier is equidistant from the line connecting the axes of the sleeve 17 and the driving sprocket wheel 34. As a result, the tension on the driving portion of the sprocket chain is the same in both positions of adjustment of the driving wheel 19.

The shaft 35 extends transversely of the crank shaft 11 and at one side of the upper base 2 and is journalled in the housing 36 secured to the upper base and the pillow block 37 on the upper base. The shaft is adapted to be operatively connected to the crank shaft 11 by means of the clutch member or collar 38 keyed to and slidably mounted on the shaft and the cooperating clutch member 39 rotatably mounted on the shaft and having the bevel gear 40 in mesh with the bevel gear 41 which is keyed to the stub shaft 42 secured to the end of the crank shaft 11. The bevel gears 40 and 41 have the same number of teeth so that the shaft 35 makes one revolution for each revolution of the crank shaft 11 when the clutch members 38 and 39 are in driving engagement. The clutch members 38 and 39 have single teeth for engagement upon longitudinal movement of the clutch member 38, toward the clutch member 39 to secure synchronized operation and predetermined timing of the indexing mechanism with the gap rolls. The clutch member 38 is connected to the yoke 43 mounted on and secured to the shaft 44 journalled in the housing 36 and the shaft is adapted to be oscillated to move the clutch member 38 into or out of engagement with the clutch member 39 by the fluid cylinder 45 which has its piston connected to the link 46 which, in turn, is connected to the lever 47 fixed to the shaft 44. For urging the clutch member 38 into engagement with the clutch member 39 and yieldably holding the clutch members in operative relation, there is the coil spring 48 encircling the shaft 35 and abutting a collar 49 on the shaft and the clutch member 38.

For controlling the operation of the fluid cylinders 12, 27 and 45 suitable valves 50, 51 and 52 respectively are provided. The valves are conventional or standard solenoid valves, each having a port connected to a source of fluid under pressure, preferably compressed air, a second port opening to the atmosphere and a third port and a fourth port connected to the opposite ends of its respective fluid cylinder. Suitable cams 53, 54 and 55 control the energization of the solenoids of the valves 50, 51 and 52 respectively, the cams 53 and 54 being in pairs and one of the cams 54 operating a time delay of conventional or standard construction. Also a push button 56 along with the cam 55 controls the energization of the solenoid of the valve 52. The cams are located in the housing 57 mounted on the upper base 2 adjacent the housing 16 for the indexing mechanism. The cams are mounted on the shaft 58 which is driven by the shaft 35 through the worm reducer 59 mounted on the upper base 2. The worm reducer is of conventional or standard construction and has a 16 to 1 gear ratio for driving the shaft 58 one revolution for sixteen revolutions of the shaft 35.

In describing the operation of the apparatus, it is assumed that the parts of the apparatus are in the positions shown in Figure 1 and that no portion of the work blank has been rolled. The work blank is located on the work holder 6 with a radius of the work blank at a right angle to the axes of the gap rolls. The gap rolls 1 and crank shaft 11 are rotating and the lower carriage 3 being reciprocated by means of the connecting rod 10 and the crank shaft. The work carrying table 4 has been released from the lower carriage 3 by the cams 2¹ operating the latches or bell cranks 3¹ on the forward motion of the lower carriage so that the work carrying table is free to move rearwardly independently of the lower carriage. Also, the clutch members 38 and 39 are in driving engagement and the indexing mechanism and controlling mechanism are being driven. Furthermore, the carrier 26 is in the position shown in Figure 7.

Figure 1 still being referred to, the dies 5 roll over the work blank and move it, the work holder 6 and the work carrying table 4 rearwardly at a faster rate than the lower carriage 3 is being moved rearwardly. After the rearward movement of the lower carriage has been completed, the latches or bell cranks 3¹ engage the work carrying table 4 and as the lower carriage is again moved forwardly it moves the work carrying table 4, the work holder 6 and the work blank forwardly. After the work blank becomes free from the dies during the above rearward movement of the work carrying table 4 and before the work blank is again engaged by the dies at the end of the forward movement of the work carrying table 4, the work holder 6 is indexed 45° by the indexing mechanism including the Geneva driven wheel 18. This driven wheel is rotated step-by-step in a counter-clockwise direction as viewed in Figure 7. The indexing of the work holder is dependent upon the timing of the indexing mechanism and may occur during the final portion of the rearward movement or all of the forward movement of the work carrying table or during both the rearward and forward movements of the work carrying table. These normal movements are repeated until eight passes have been made after which the work blank is indexed 22½° while it is free from the dies. This is effected by angularly moving the carrier 26 in a clockwise direction 22½° as viewed in Figure 7, thereby moving the driving member 19 and the Geneva driven member 18 angularly through the same angle during the usual 45° counter-clockwise indexing operation of the Geneva driven member and giving a net counter-clockwise movement of 22½° to the Geneva driven member. The angular movement of the carrier is secured by operating the valve 51 by means including one of the cams 54 to allow compressed air to enter the front end of the fluid cylinder 27. As a result of the two indexing movements, the Geneva driven member and consequently the work holder has a net advancement of 22½° at a decidedly reduced indexing speed. Then with the same sequence of operations as occur during the first eight passes eight additional passes are made along the radii passing through the peripheral corners after which the valve 50 is operated by one of the cams 53 to allow compressed air to enter the front end of the cylinder 12 and thereby move the work carrying table 4 to unloading and loading position. Also, the valve 52 is operated by the cam 55 to allow compressed air to enter the front end of the fluid cylinder 45 and thereby uncouple the clutch members 38 and 39 as shown in Figure 6. Then the valve 51 is operated by means including the time delay and the associated cam 54 to allow compressed air to enter the rear end of the fluid cylinder 27 and thereby return the carrier to its original position, as shown in Figure 7, after the clutch members have been uncoupled. While the work carrying table is in unloading and loading position and is stationary although the lower carriage continues to reciprocate, the finished disc is removed and a work blank to be processed is placed on the work holder. Then the indexing mechanism and controlling mechanism are started by manually depressing the push button 56 to operate the valve 52 to allow compressed air to enter the rear end of the fluid cylinder 45 and thereby move the clutch member 38 against the clutch member 39 and bring the single teeth of the clutch members into engagement at a predetermined time thereby starting the indexing mechanism and the controlling mechanism. The valve 50 of the controlling mechanism is then operated by means including one of the cams 53 to allow compressed air to enter the rear end of the cylinder 12 and thereby move the work carrying table 4 forward to its normal rearward position. The engagement of the single teeth of the clutch members 38 and 39 and the forward movement of the work carrying table 4 to its normal rearward position both occur during the rearward movement of the lower carriage so that upon forward movement of the lower carriage it moves the work carrying table to its forwardmost position as shown in Figure 1. Since the indexing mechanism is being driven, the work blank in its forwardmost position is correctly located with respect to the gap rolls and the above cycle of steps may then be effected.

What I claim as my invention is:

1. Mechanism for indexing a work blank comprising a rotatable work blank holder, a shaft for driving said holder, a sleeve on said shaft for rotating the same, a Geneva driven wheel mounted on said sleeve for rotating the latter, a driving wheel operatively connected to said driven wheel, means for driving said driving wheel, and a carrier for said driving wheel rotatably mounted on said sleeve and movable through a predetermined angle to move said driven and driving wheels as a unit through a predetermined angle.

2. Indexing mechanism comprising a rotatable sleeve, a Geneva driven wheel mounted on and in driving engagement with said sleeve, a driving wheel operatively connected to said driven wheel to drive the same, a carrier rotatably mounted on said sleeve and carrying said driving wheel, means for angularly moving said carrier through a predetermined angle, and means for driving said driving wheel in either position of angular adjustment of said carrier.

3. In a machine tool having a crank shaft for advancing a holder for a work blank, indexing mechanism for the holder comprising a rotatable Geneva driven wheel operatively connected to the holder, a rotatable driving wheel operatively connected to said driven wheel, clutch members engageable with each other to drive said driving wheel from the crank shaft during a predetermined interval, a carrier for said driving wheel movable through a predetermined angle, a fluid cylinder operatively connected to said carrier, valve means for controlling the flow of fluid to said cylinder to move said carrier in opposite directions, cam means driven by said clutch members when in engagement for operating said valve means to move said carrier in one direction, and time delay means for operating said valve means to move said carrier in the opposite direction when said clutch members are out of engagement.

4. An indexing mechanism for successive rotation of a work blank through different increments of rotation comprising a work blank support, a Geneva wheel operatively connected to said support, a Geneva pinion engaging said wheel, means fixing the axis of said pinion selectively at two positions angularly spaced about said wheel at a fixed angular increment different from the angular pitch of said wheel for cyclic operation of said pinion and wheel in either of said two positions, and means for rotating said pinion and wheel together about the axis of said wheel between said two positions of said pinion, thereby rotating said wheel through the said angular increment for an intermediate indexing operation through an increment different from that effected in the aforesaid cyclic operation.

5. An indexing mechanism for successive rotation of a work blank through different increments of rotation comprising a work blank support, a Geneva wheel operatively connected to said support, a pinion engaging said wheel for rotating the latter in one direction, a carrier for said pinion movable about the axis of said wheel between two positions spaced apart an angular increment different from the angular pitch of said wheel for cyclic operation of said pinion and wheel in either of said two positions, stop means engageable with said carrier for determining said two positions, and means for moving said carrier about the axis of said wheel in a direction opposite the one direction aforesaid from one position to the other to correspondingly rotate said pinion and wheel, thereby rotating said wheel through the said angular increment for an intermediate indexing operation through an increment different from that effected in the aforesaid cyclic operation.

6. An indexing mechanism comprising a Geneva wheel, a Geneva pinion engaging said wheel, means fixing the axis of said pinion selectively at two positions angularly spaced about said wheel at a fixed angular increment different from the angular pitch of said wheel for cyclic operation of said pinion and wheel in either of said two positions, and means for rotating said pinion and wheel together about the axis of said wheel between said two positions of said pinion, thereby rotating said wheel through the said angular increment for an intermediate indexing operation through an increment different from that effected in the aforesaid cyclic operation.

7. An indexing mechanism comprising a Geneva wheel, a Geneva pinion engaging said wheel, said pinion being rotatable about the axis of said wheel, means for rotating said pinion about its axis a predetermined number of revolutions whereby said wheel is intermittently advanced through a predetermined angle, and means for rotating said pinion and wheel about the axis of said wheel through a predetermined angle different from the angular pitch of said wheel.

8. An indexing mechanism comprising a Geneva wheel, a Geneva pinion engaging said wheel, said pinion being rotatable about the axis of said wheel, means for rotating said pinion in one direction about its axis a predetermined number of revolutions whereby said wheel is intermittently advanced through a predetermined angle, means for rotating said pinion and wheel about the axis of said wheel through a predetermined angle different from the angular pitch of said wheel, and means for continued rotation of said pinion in the same direction to continue the intermittent advance of said wheel.

9. An indexing mechanism comprising a Geneva wheel, a Geneva pinion engaging said wheel, said pinion being rotatable about the axis of said wheel, means for rotating said pinion in one direction about its axis a predetermined number of revolutions whereby said wheel is intermittently advanced through a predetermined angle, means for rotating said pinion and wheel about the axis of said wheel in one direction through a predetermined angle different from the angular pitch of said wheel, means for continued rotation of said pinion in the same direction about its axis through the same number of revolutions whereby said wheel is intermittently advanced through the first-mentioned predetermined angle, and means for rotating said pinion and wheel about the axis of said wheel in the opposite direction through the second-mentioned angle.

References Cited in the file of this patent

UNITED STATES PATENTS

| | | |
|---|---|---|
| 1,808,454 | Dina | June 2, 1931 |
| 1,894,689 | Ingersoll | Jan. 17, 1933 |